US011409945B2

(12) United States Patent
McCann et al.

(10) Patent No.: US 11,409,945 B2
(45) Date of Patent: Aug. 9, 2022

(54) NATURAL LANGUAGE PROCESSING USING CONTEXT-SPECIFIC WORD VECTORS

(71) Applicant: salesforce.com, inc., San Francisco, CA (US)

(72) Inventors: Bryan McCann, Menlo Park, CA (US); Caiming Xiong, Mountain View, CA (US); Richard Socher, Menlo Park, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 134 days.

(21) Appl. No.: 17/027,130

(22) Filed: Sep. 21, 2020

(65) Prior Publication Data

US 2021/0073459 A1    Mar. 11, 2021

Related U.S. Application Data

(63) Continuation of application No. 15/982,841, filed on May 17, 2018, now Pat. No. 10,817,650.
(Continued)

(51) Int. Cl.
*G06F 40/126* (2020.01)
*G06N 3/08* (2006.01)
(Continued)

(52) U.S. Cl.
CPC .......... *G06F 40/126* (2020.01); *G06F 40/205* (2020.01); *G06F 40/289* (2020.01);
(Continued)

(58) Field of Classification Search
USPC ...................................... 704/1–504
See application file for complete search history.

(56) References Cited

U.S. PATENT DOCUMENTS 10,262,062 B2 *  4/2019  Chang ................. G06F 16/3329
10,282,663 B2    5/2019  Socher et al.
(Continued)

FOREIGN PATENT DOCUMENTS

CN          106126507 A      11/2016

OTHER PUBLICATIONS

Office Action received in Canadian Patent Application No. 3,062,891, dated Dec. 9, 2020.
(Continued)

*Primary Examiner* — Marcus T Riley
(74) *Attorney, Agent, or Firm* — Haynes and Boone, LLP

(57) ABSTRACT

A system is provided for natural language processing. In some embodiments, the system includes an encoder for generating context-specific word vectors for at least one input sequence of words. The encoder is pre-trained using training data for performing a first natural language processing task. A neural network performs a second natural language processing task on the at least one input sequence of words using the context-specific word vectors. The first natural language process task is different from the second natural language processing task and the neural network is separately trained from the encoder. In some embodiments, the first natural processing task can be machine translation, and the second natural processing task can be one of sentiment analysis, question classification, entailment classification, and question answering.

20 Claims, 11 Drawing Sheets

Related U.S. Application Data

(60) Provisional application No. 62/536,959, filed on Jul. 25, 2017, provisional application No. 62/508,977, filed on May 19, 2017.

(51) Int. Cl.
*G06N 3/04* (2006.01)
*G06F 40/30* (2020.01)
*G06F 40/47* (2020.01)
*G06F 40/205* (2020.01)
*G06F 40/289* (2020.01)
*G06F 40/44* (2020.01)
*G06F 40/58* (2020.01)

(52) U.S. Cl.
CPC .............. *G06F 40/30* (2020.01); *G06F 40/47* (2020.01); *G06N 3/0445* (2013.01); *G06N 3/0454* (2013.01); *G06N 3/08* (2013.01); *G06F 40/44* (2020.01); *G06F 40/58* (2020.01)

(56) References Cited

U.S. PATENT DOCUMENTS

| | | | |
|---|---|---|---|
| 10,346,721 B2 | 7/2019 | Albright et al. | |
| 10,474,709 B2 | 11/2019 | Paulus | |
| 10,521,465 B2 | 12/2019 | Paulus | |
| 10,542,270 B2 | 1/2020 | Zhou et al. | |
| 10,546,217 B2 | 1/2020 | Albright et al. | |
| 10,558,750 B2 | 2/2020 | Lu et al. | |
| 10,565,305 B2 | 2/2020 | Lu et al. | |
| 10,565,306 B2 | 2/2020 | Lu et al. | |
| 10,565,318 B2 | 2/2020 | Bradbury | |
| 10,565,493 B2 | 2/2020 | Merity et al. | |
| 10,573,295 B2 | 2/2020 | Zhou et al. | |
| 10,592,767 B2 | 3/2020 | Trott et al. | |
| 10,699,060 B2* | 6/2020 | McCann | G06F 40/205 |
| 10,747,761 B2 | 8/2020 | Zhong et al. | |
| 10,776,581 B2 | 9/2020 | McCann et al. | |
| 10,783,875 B2 | 9/2020 | Hosseini-Asl et al. | |
| 10,817,650 B2* | 10/2020 | McCann | G06F 40/205 |
| 10,839,284 B2* | 11/2020 | Hashimoto | G06N 3/08 |
| 10,846,478 B2 | 11/2020 | Lu et al. | |
| 10,902,289 B2 | 1/2021 | Gao et al. | |
| 10,909,157 B2 | 2/2021 | Paulus et al. | |
| 10,929,607 B2 | 2/2021 | Zhong et al. | |
| 10,958,925 B2 | 3/2021 | Zhou et al. | |
| 10,963,652 B2 | 3/2021 | Hashimoto et al. | |
| 10,963,782 B2 | 3/2021 | Xiong et al. | |
| 10,970,486 B2 | 4/2021 | MacHado et al. | |
| 2016/0247061 A1 | 8/2016 | Trask et al. | |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher et al. | |
| 2017/0177715 A1* | 6/2017 | Chang | G06N 5/04 |
| 2018/0096219 A1 | 4/2018 | Socher | |
| 2018/0121787 A1* | 5/2018 | Hashimoto | G06F 40/205 |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0268287 A1 | 9/2018 | Johansen et al. | |
| 2018/0268298 A1 | 9/2018 | Johansen et al. | |
| 2018/0336453 A1 | 11/2018 | Merity et al. | |
| 2018/0349359 A1* | 12/2018 | McCann | G06F 40/47 |
| 2018/0373682 A1* | 12/2018 | McCann | G06N 3/08 |
| 2018/0373987 A1 | 12/2018 | Zhang et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0188568 A1 | 6/2019 | Keskar et al. | |
| 2019/0213482 A1 | 7/2019 | Socher et al. | |
| 2019/0251431 A1 | 8/2019 | Keskar et al. | |
| 2019/0258939 A1 | 8/2019 | Min et al. | |
| 2019/0286073 A1 | 9/2019 | Asl et al. | |
| 2019/0355270 A1 | 11/2019 | McCann et al. | |
| 2019/0362246 A1 | 11/2019 | Lin et al. | |
| 2020/0005765 A1 | 1/2020 | Zhou et al. | |
| 2020/0065651 A1 | 2/2020 | Merity et al. | |
| 2020/0090033 A1 | 3/2020 | Ramachandran et al. | |
| 2020/0090034 A1 | 3/2020 | Ramachandran et al. | |
| 2020/0103911 A1 | 4/2020 | Ma et al. | |
| 2020/0104643 A1 | 4/2020 | Hu et al. | |
| 2020/0104699 A1 | 4/2020 | Zhou et al. | |
| 2020/0105272 A1 | 4/2020 | Wu et al. | |
| 2020/0117854 A1 | 4/2020 | Lu et al. | |
| 2020/0117861 A1 | 4/2020 | Bradbury | |
| 2020/0142917 A1 | 5/2020 | Paulus | |
| 2020/0175305 A1 | 6/2020 | Trott et al. | |
| 2020/0234113 A1 | 7/2020 | Liu | |
| 2020/0272940 A1 | 8/2020 | Sun et al. | |
| 2020/0285704 A1 | 9/2020 | Rajani et al. | |
| 2020/0285705 A1 | 9/2020 | Zheng et al. | |
| 2020/0285706 A1 | 9/2020 | Singh et al. | |
| 2020/0285993 A1 | 9/2020 | Liu et al. | |
| 2020/0293655 A1* | 9/2020 | Long | G06N 20/00 |
| 2020/0302178 A1 | 9/2020 | Gao et al. | |
| 2020/0334334 A1 | 10/2020 | Keskar et al. | |
| 2020/0364299 A1 | 11/2020 | Niu et al. | |
| 2020/0364542 A1 | 11/2020 | Sun | |
| 2020/0364580 A1 | 11/2020 | Shang et al. | |
| 2020/0372116 A1 | 11/2020 | Gao et al. | |
| 2020/0372319 A1 | 11/2020 | Sun et al. | |
| 2020/0372339 A1 | 11/2020 | Che et al. | |
| 2020/0372341 A1 | 11/2020 | Asai et al. | |
| 2020/0380213 A1 | 12/2020 | McCann et al. | |
| 2021/0042604 A1 | 2/2021 | Hashimoto et al. | |
| 2021/0049236 A1 | 2/2021 | Nguyen et al. | |
| 2021/0073459 A1* | 3/2021 | McCann | G06N 3/08 |
| 2021/0089588 A1 | 3/2021 | Le et al. | |
| 2021/0089882 A1 | 3/2021 | Sun et al. | |
| 2021/0089883 A1 | 3/2021 | Li et al. | |
| 2021/0142164 A1* | 5/2021 | Liu | G06F 40/30 |

OTHER PUBLICATIONS

Ji, Yangfeng, et al., "Document Context Language Models", Workshop Track—ICLR 2016, Feb. 21, 2016, XP055403685.

Nam, Hyeonseob, et al., "Dual Attention Networks for Multimodal Reasoning and Matching", Arxiv.org, Cornell Unversity Library, 201 Olin Library Cornell University Ithaca, NY 14853, Nov. 2, 2016, XP080728777.

* cited by examiner

| Dataset | Random | GloVe | Char | GloVe+ | | | | |
|---|---|---|---|---|---|---|---|---|
| | | | | CoVe-S | CoVe-M | CoVe-L | Char+CoVe-L |
| SST-2 | 84.2 | 88.4 | 90.1 | 89.0 | 90.9 | 91.1 | 91.2 |
| SST-5 | 48.6 | 53.5 | 52.2 | 54.0 | 54.7 | 54.5 | 55.2 |
| IMDb | 88.4 | 91.1 | 91.3 | 90.6 | 91.6 | 91.7 | 92.1 |
| TREC-6 | 88.9 | 94.9 | 94.7 | 94.7 | 95.1 | 95.8 | 95.8 |
| TREC-50 | 81.9 | 89.2 | 89.8 | 89.6 | 89.6 | 90.5 | 91.2 |
| SNLI | 82.3 | 87.7 | 87.7 | 87.3 | 87.5 | 87.9 | 88.1 |
| SQuAD | 65.4 | 76.0 | 78.1 | 76.5 | 77.1 | 79.5 | 79.9 |

FIG. 11

NATURAL LANGUAGE PROCESSING USING CONTEXT-SPECIFIC WORD VECTORS

RELATED APPLICATIONS

The present application is a continuation of U.S. application Ser. No. 15/982,841 filed on May 17, 2018 entitled "NATURAL LANGUAGE PROCESSING USING CONTEXT-SPECIFIC WORD VECTORS," which claims priority to U.S. Provisional Patent Application Ser. No. 62/508,977 filed on May 19, 2017 and entitled "Towards the ImageNet-CNN of NLP: Pretraining Encoders with Machine Translation," and U.S. Provisional Patent Application Ser. No. 62/536,959 filed on Jul. 25, 2017 and entitled "Context-Specific Word Vectors for Use in Natural Language Processing Models," all of which are incorporated by reference in their entirety.

TECHNICAL FIELD

The present disclosure relates generally to neural networks and more specifically to neural networks for natural language processing using context-specific word vectors.

BACKGROUND

Neural networks have demonstrated great promise as a technique for automatically analyzing real-world information with human-like accuracy. In general, neural network models receive input information and make predictions based on the input information. For example, a neural network classifier may predict a class of the input information among a predetermined set of classes. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications. Indeed, some applications have even been identified in which neural networking models exceed human-level performance.

BRIEF DESCRIPTION OF THE DRAWINGS

FIG. 11 is a table illustrating performance results of systems for natural language processing based on different input representations.

Figure 1:
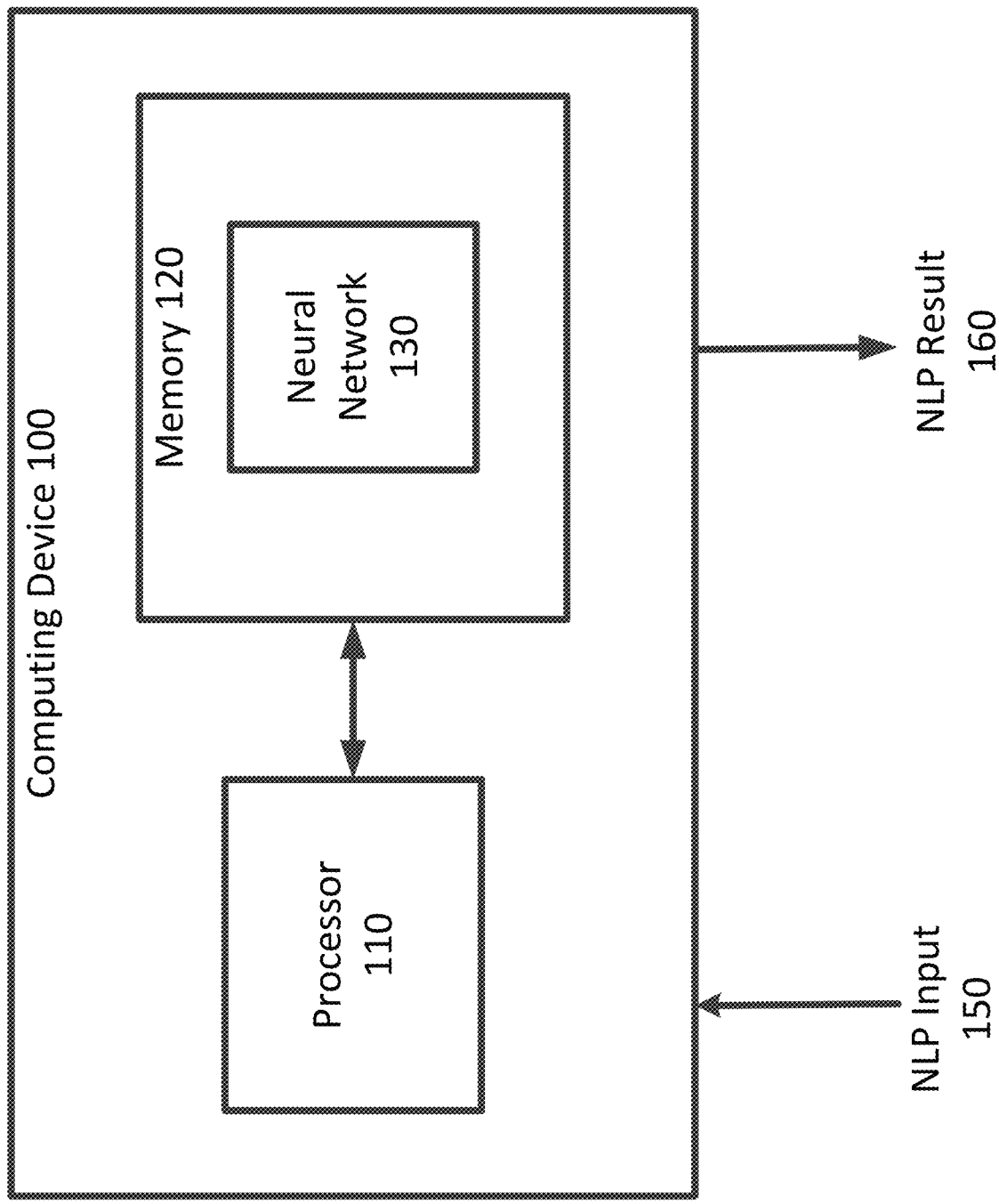
FIG. 1 is a simplified diagram of a computing device according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Natural language processing (NLP) is one class of problems to which neural networks may be applied. NLP can be used to instill new neural networks with an understanding of individual words and phrases. For most problems or tasks in NLP, however, understanding context is also important. Translation models need to understand, for example, how the words in an English sentence work together in order to generate a German translation. Likewise, summarization models need context in order to know which words are most important. Models performing sentiment analysis need to understand how to pick up on key words that change the sentiment expressed by others. And question answering models rely on an understanding of how words in a question shift the importance of words in a document. Accordingly, it is desirable to develop a way to initialize neural networks for NLP with an understanding of how various words might relate to other words or how context influences a word's meaning.

According to some embodiments, a neural network is taught how to understand words in context by training it on a first NLP task—e.g., teaching it how to translate from English to German. The trained network can then be reused in a new or other neural network that performs a second NLP task—e.g., classification, question answering, sentiment analysis, entailment classification, language translation, etc. The pre-trained network's outputs—context-specific word vectors (CoVe)—are provided as inputs to new networks that learn other NLP tasks. Experiments show that providing CoVe to these new networks can improve their performance, thus validating that various NLP models or tasks can benefit from using a neural network that has already learned how to contextualize words.

In some embodiments, various NLP models or tasks—such as classification, question answering, sentiment analysis, and translation—can be improved by using context-specific word vectors generated by training an encoder with a NLP task that may be different from the NLP task to be performed. More generally speaking, significant gains have been made through transfer and multi-task learning between synergistic tasks. In many cases, these synergies can be exploited by architectures that rely on similar components. Embodiments disclosed herein use networks that have already learned how or been trained to contextualize words to give other neural networks an advantage in learning to understand other parts of natural language.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities. In some examples, memory 120 may include non-transitory, tangible, machine readable media that includes executable code that when run by one or more processors (e.g., processor 110) may cause the one or more processors to perform any of the methods described further herein.

As shown, memory 120 includes a neural network 130. Neural network 130 may be used to implement and/or emulate any of the neural networks described further herein. In some examples, neural network 130 may include a multi-layer or deep neural network. According to some embodiments, examples of multi-layer neural networks include the ResNet-32, DenseNet, PyramidNet, SENet, AWD-LSTM, AWD-QRNN and/or the like neural networks. The ResNet-32 neural network is described in further detail in He, et al., "Deep Residual Learning for Image Recognition," arXiv:1512.03385, submitted on Dec. 10, 2015; the DenseNet neural network is described in further detail in Iandola, et al., "Densenet: Implementing Efficient Convnet Descriptor Pyramids," arXiv:1404.1869, submitted Apr. 7, 2014, the PyramidNet neural network is described in further detail in Han, et al., "Deep Pyramidal Residual Networks," arXiv:1610.02915, submitted Oct. 10, 2016; the SENet neural network is described in further detail in Hu, et al., "Squeeze-and-Excitation Networks," arXiv:1709.01507, Sep. 5, 2017; the AWD-LSTM neural network is described in further detail in Bradbury, et al., "Quasi-Recurrent Neural Networks," arXiv:1611.01576, submitted on Nov. 5, 2016; each of which are incorporated by reference herein.

According to some embodiments, the neural network 130 may use an encoder that is pre-trained for a first kind of NLP task, such as, for example, translation. The computing device 100 may receive training data that includes one or more sequences of words in a first language (e.g., English), and one or more corresponding sequences of words in a second language (e.g., German) that represent the expected and/or desired translation of the respective first language word sequences. To illustrate, suppose an input word sequence provided to a computing device 100 includes the English word sequence "Let's go for a walk." The corresponding German word sequence is "Lass uns spazieren gehen." Computing device 100 uses this training data to generate and output context-specific word vectors or "context vectors" (CoVe) for the words or sequences of words in the first language. Stated differently, the encoder is taught how to understand words in context by first teaching it how to translate from one language into another (e.g., English to German). Once trained, the encoder may be used by the neural network 130 to perform a second kind of NLP task—e.g., sentiment analysis (Stanford Sentiment Treebank (SST), IMDb), question classification (TREC), entailment classification (Stanford Natural Language Inference Corpus (SNLI)), question answering (Stanford Question Answering Dataset (SQuAD)) and/or the like. To this end, the computing device 100 receives input 150 for the second kind of NLP task, and generates results 160 for that task.

Figure 2:
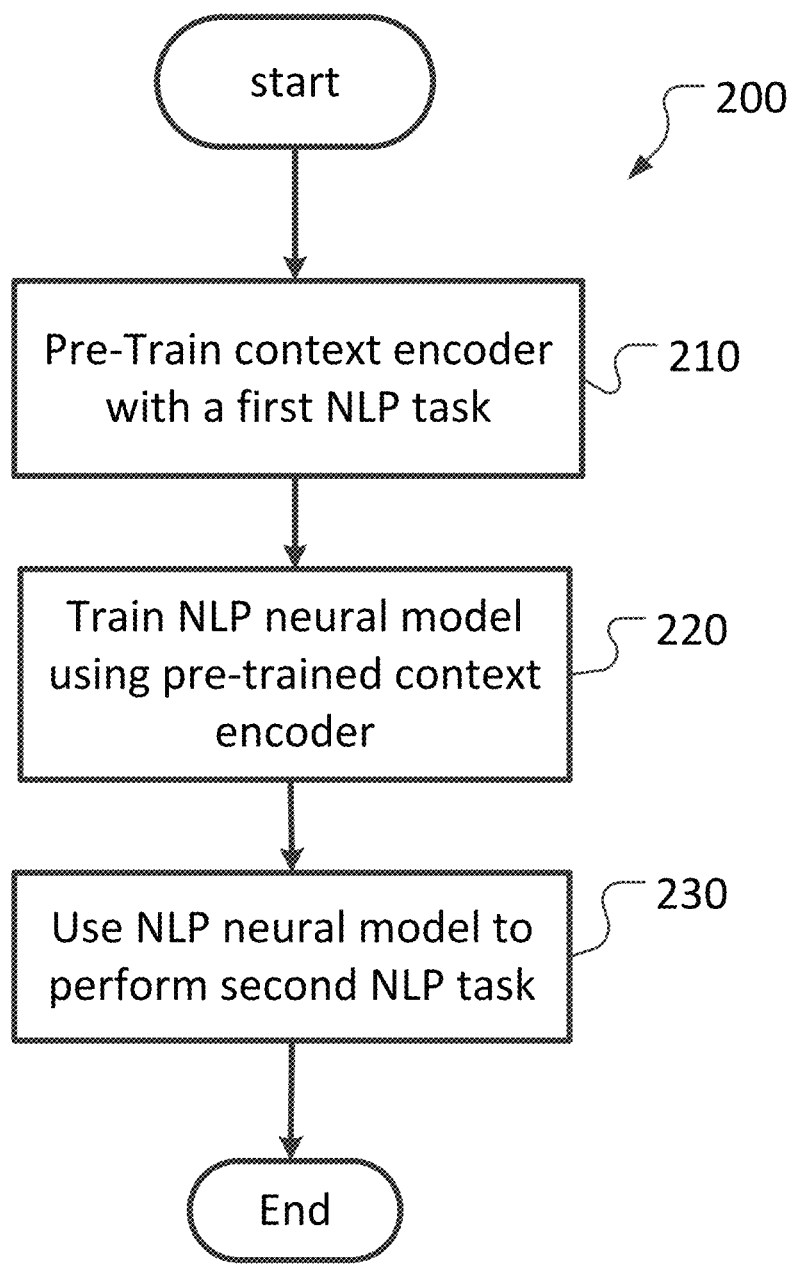
FIG. 2 is a simplified diagram of a method for pre-training an encoder on a first natural language processing (NLP) task and performing a second NLP task using same according to some embodiments.

FIG. 2 is a simplified diagram of a method 200 for pre-training an encoder on a first NLP task and performing a second NLP task using the same, according to some embodiments. One or more of the processes 210-220 of method 200 may be implemented, at least in part, in the form of executable code stored on non-transitory, tangible, machine-readable media that when run by one or more processors may cause the one or more processors to perform one or more of the processes 210-230. In some embodiments, method 200 can be performed by computing device 100 of FIG. 1.

According to some embodiments, method 200 utilizes transfer learning, or domain adaptation. Transfer learning has been applied in a variety of areas where researchers identify synergistic relationships between independently collected datasets. In some embodiments, the source domain of transfer learning is machine translation.

At a process 210, an encoder of a neural network is pre-trained using training data for performing the first NLP task. In some embodiments, the first NLP task can be translation. The nature of the translation task has appealing properties for training a general context encoder—e.g. translation seems to require a more general sense of language understanding than other NLP tasks, like text classification. During training, the encoder is provided with training and/or testing data 150 that, in some embodiments, may include one or more sequences of words in a first language (e.g., English), and one or more corresponding sequences of words in a second language (e.g., German). The training data 150 can be one or more machine translation (MT) datasets. Machine translation is a suitable source domain for transfer learning because the task, by nature, requires the model to faithfully reproduce a sentence in the target language without losing information in the source language sentence. Moreover, there is an abundance of machine translation data that can be used for transfer learning; indeed, machine translation training sets are much larger than those for most other NLP tasks. Possible training sets include various English-German machine translation (MT) datasets. For example, the WMT 2016 multi-modal translation shared task—often referred to as "Multi30k" and described in further detail in Specia, et al., "A shared task on multimodal machine translation and crosslingual image description," *Proceedings of the 1st Conference on Machine Translation*, W M T, 2016, pp. 543-553, which is incorporated by reference herein—is a dataset, consisting of 30,000 sentence pairs that briefly describe Flickr captions. Due to the nature of image captions, this dataset contains sentences that are, on average, shorter and simpler than those from larger counterparts. The 2016 version of the machine translation task prepared for the International Workshop on Spoken Language Translation—described in further detail in Cettolo, et al., "The IWSLT 2015 evaluation campaign," *In International Workshop on Spoken Language Translation*, 2015, which is incorporated by reference herein—is a larger dataset, consisting of 209,772 sentence pairs from transcribed TED presentations that cover a wide variety of topics with more conversational language than in other machine translation datasets. The news translation shared task from WMT 2017 is a large MT dataset, consisting of roughly 7 million sentence pairs that comes from web crawl data, a news and commentary corpus, European Parliament proceedings, and European Union press releases. These three MT datasets may be referred to as MT-Small, MT-Medium, and MT-Large, respectively. Each of these MT datasets is tokenized using the Moses Toolkit, which is described in further detail in Koehn, et al., "Moses: Open source toolkit for statistical machine translation," *Proceedings of the 45th Annual Meeting of the Association of the Computational Linguistics*, 2007, pp. 177-180, which is incorporated by reference herein.

The encoder generates or outputs context vectors (or CoVe) 160 for the words or sequences in the first language. The context vectors from encoders trained on MT-Small, MT-Medium, and MT-Large may be referred to as CoVe-S, CoVe-M, and CoVe-L. The pre-trained encoder of the neural network can then be reused or applied to one or more other NLP tasks.

At a process 220, a new or another neural network 130 is trained for second NLP task using the pre-trained context encoder. The pre-trained encoder's outputs—context vectors (or CoVe) for the words or sequences in the first language—are provided as inputs to the new or other neural network 130 that learns or executes other NLP tasks performed on the same language, such as classification, question answering, sentiment analysis, other machine translation tasks, and/or the like. In some embodiments, fixed-length representations obtained from neural machine translation (NMT) encoders are transferred in for the training. In some embodiments, representations for each token in an input sequence are transferred in for training. The latter approach makes the transfer of the pre-trained context encoder for the other NLP task more directly compatible with subsequent long-term short-term memories (LSTMs), attention mechanisms, and, in general, layers that expect input sequences. This additionally facilitates the transfer of sequential dependencies between encoder states. In some embodiments, the pre-trained encoder is not further trained during process 220.

At a process 230, the neural network 130 is used to perform the second NLP task. The computing device 100 receives input 150 for the second NLP task, and generates results 160 for that task. Experiments show that providing the neural network 130 with context vectors from an encoder pre-trained on a first NLP task (e.g., machine translation) can improve its performance for a second NLP task (e.g., classification, question answering, sentiment analysis).

Aspects or embodiments for each of these processes 210-230 of method 200 are described in more detail herein.

Figure 3:
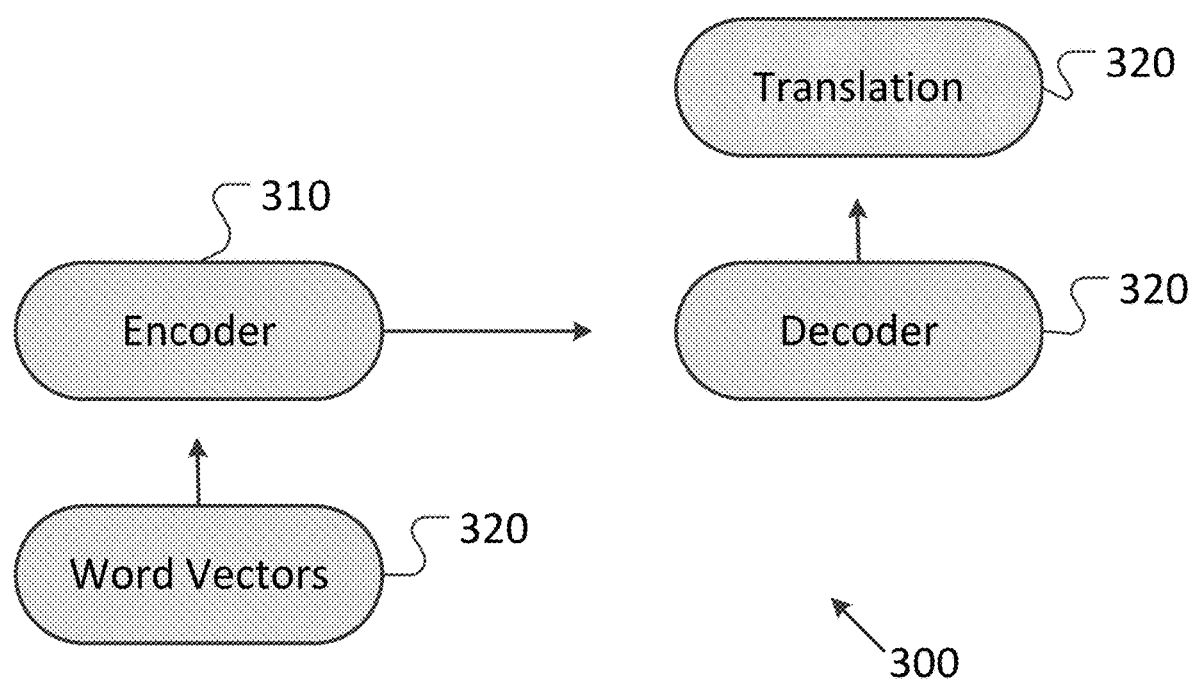
FIG. 3 is a simplified diagram illustrating the pre-training of an encoder according to some embodiments.

FIG. 3 is a simplified diagram illustrating the pre-training of an encoder 310 according to some embodiments. In some embodiments, the encoder 310 may include or be implemented with one or more long-term short-term memory (LSTM) encoders.

The encoder 310 receives training data, which may be in the form of word vectors 320 for one or more sequences of words in a first language (e.g., English). Instead of reading sequences of words as text, deep learning models read sequences of word vectors. A word vector associates each word in the language with a list of numbers. Many deep learning models for NLP rely on word vectors to represent the meaning of individual words.

Figure 4:
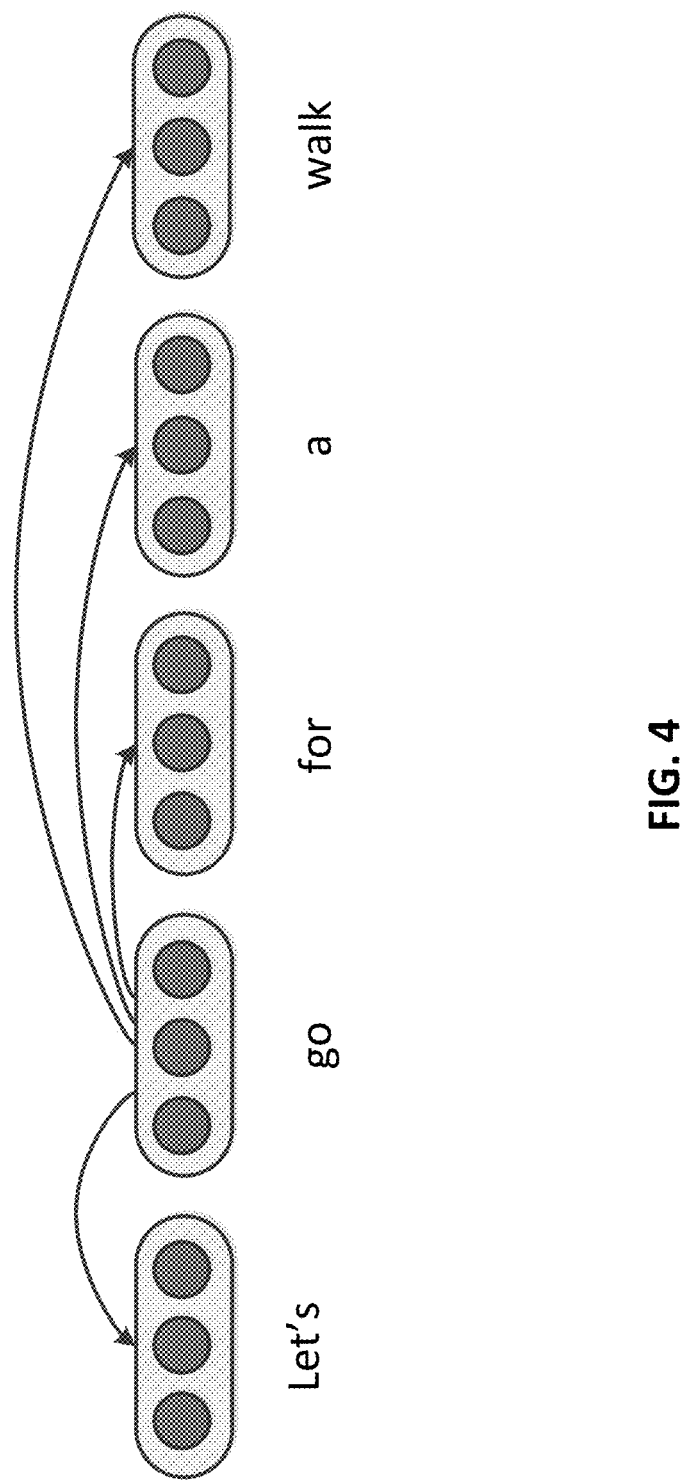
FIG. 4 illustrates an example of word vectors for a sequence of words.

FIG. 4 illustrates an example of word vectors for a sequence of words: "Let's go for a walk." In some embodiments, the word vectors 320 of a model are initialized to lists of random numbers before the model is trained for a specific task. In some embodiments, the word vectors 320 of a model can be initialized with those obtained by running methods like word2vec, GloVe, or FastText. Each of those methods defines a way of learning word vectors with useful properties. The first two methods work off of the hypothesis that at least part of a word's meaning is tied to how it is used. word2vec trains a model to take in a word and predict a local context window; the model sees a word and tries to predict the words around it. GloVe takes a similar approach, but it also explicitly adds statistics about how often each word occurs with each other word. In both cases, each word is represented by a corresponding word vector, and training forces the word vectors to correlate with each other in ways that are tied to the usage of the word in natural language. With reference to the specific example of "Let's go for a walk" shown in FIG. 4, algorithms like word2vec and GloVe produce word vectors correlated with the word vectors that regularly occur around it in natural language. In this way the vector for "go" comes to mean that the word "go" appears around words like "Let's," "for," "a," and "walk."

Referring back to FIG. 3, the encoder 310 is trained by having it perform a first NLP task which, in some embodiments, can be machine translation (MT) of the word sequence in a first language (e.g., "Let's go for a walk") into a corresponding word sequence in a second language (e.g., "Lass uns spazieren gehen"). To accomplish this training, the encoder 310 interacts with a decoder 330 to generate the translation 340. In some embodiments, the LSTM encoders are trained on several machine translation datasets. Experiments show that the quantity of training data used to train the MT-LSTM is positively correlated with performance on downstream tasks, such as when the encoder is used or employed for a second NLP task. This is yet another advantage of using MT as a training task, as data for MT is more abundant than for most other supervised NLP tasks, and it suggests that higher quality MT-LSTMs carry over more useful information. While machine translation might seem unrelated to other NLP tasks, such as text classification and question answering, this reinforces the idea that machine translation is a good candidate NLP task for models with a stronger sense of natural language understanding.

Figure 5:
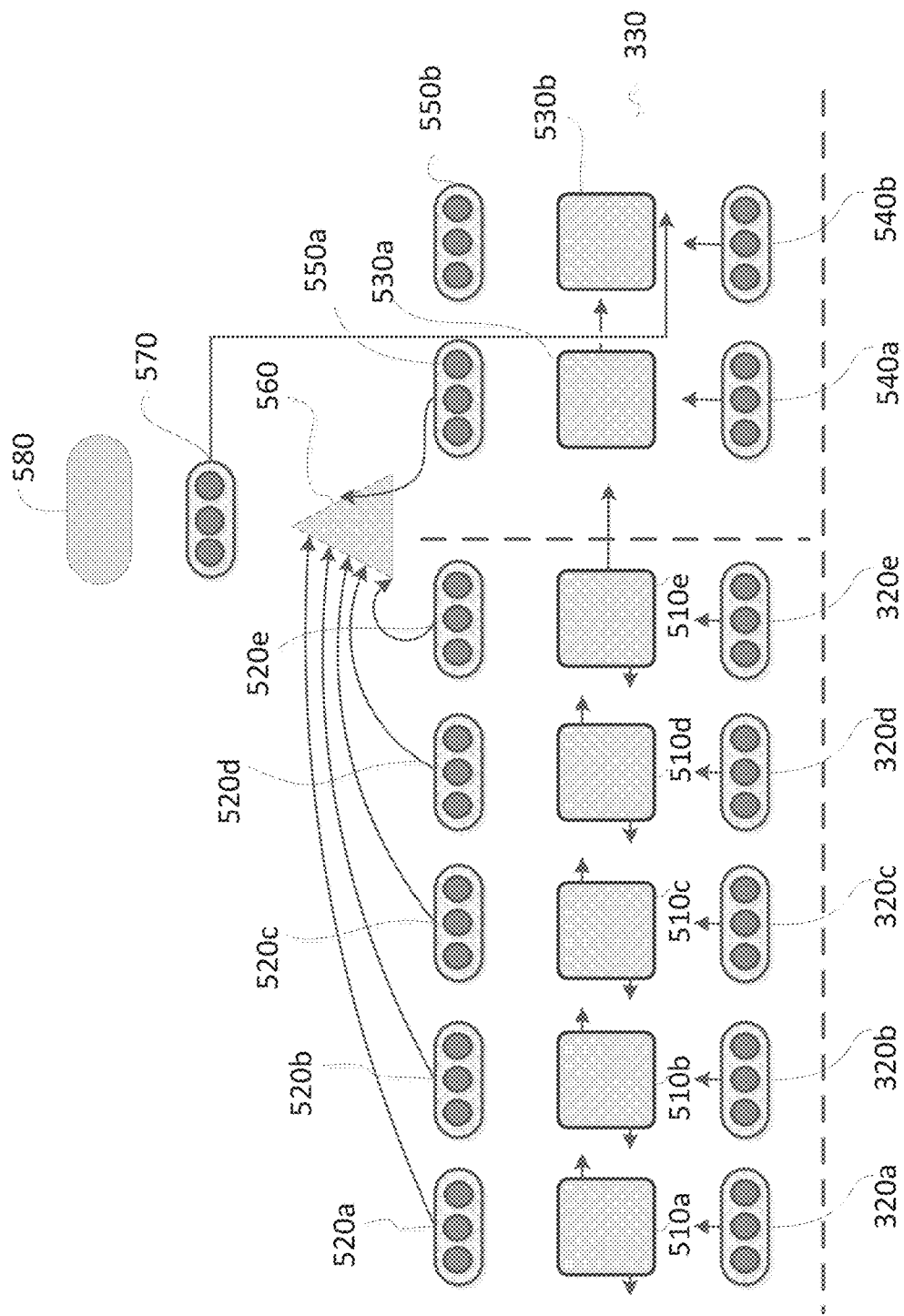
FIG. 5 is a simplified diagram illustrating the pre-training of an encoder on an NLP task of translation according to some embodiments

While FIG. 3 is a high-level diagram, FIG. 5 illustrates more details for the pre-training of the encoder 310 on the NLP task of machine translation according to some embodiments. And FIG. 6 shows a corresponding method 600 for pre-training the encoder illustrated in FIG. 5.

Figure 6:
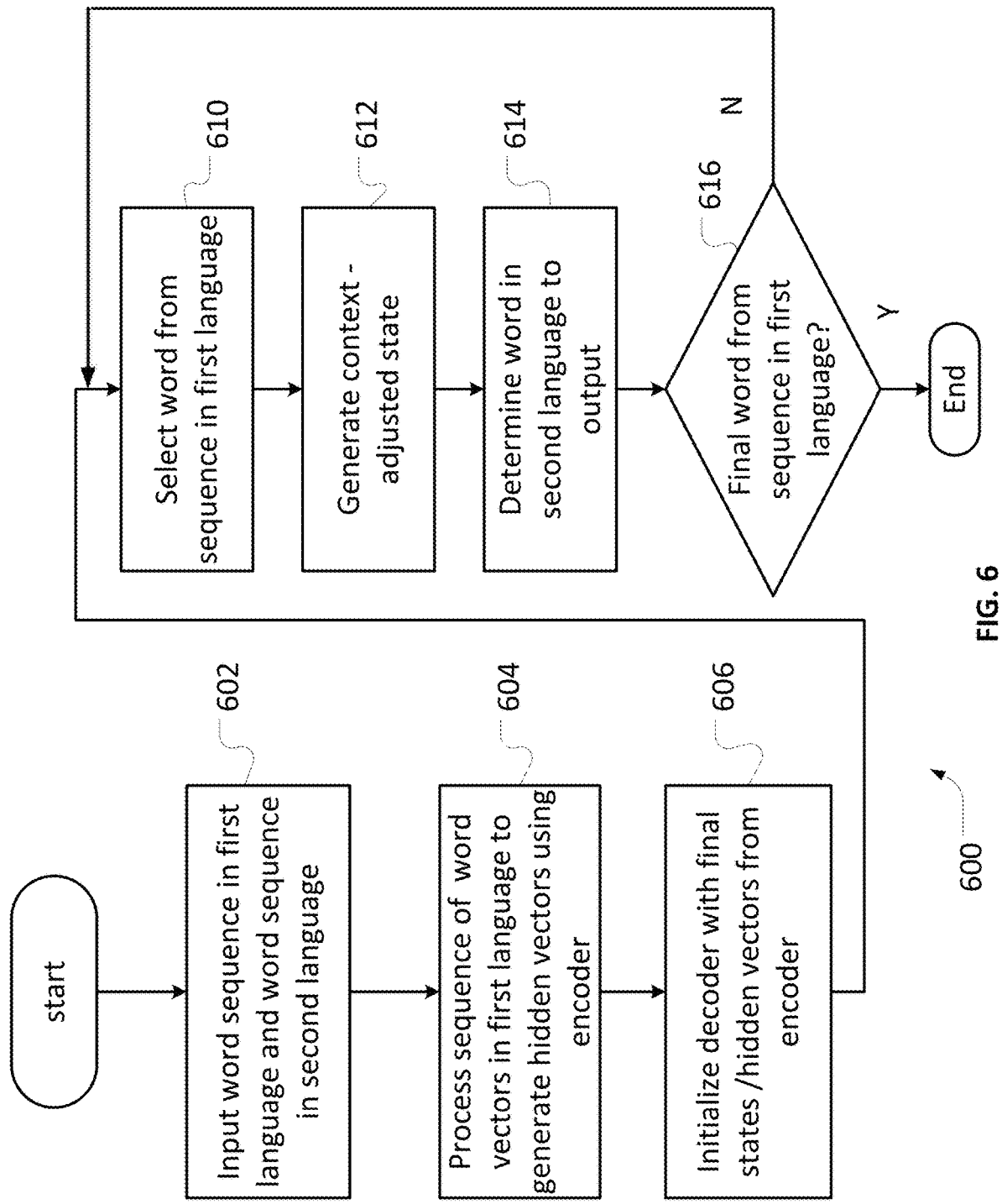
FIG. 6 is a simplified diagram of a method for pre-training an encoder on an NLP task of translation according to some embodiments.

With reference to FIGS. 5 and 6, the method 600 starts with a process 602. At process 602, word vectors 320a-e for a sequence of words in a first or source language $w^x=[w^x_1, \ldots, w^x_n]$ (e.g., English—"Let's go for a walk") are input or provided to the encoder 310. And word vectors 540 for a sequence of words in a second or target language $w^z=[w^z_1, \ldots, w^z_n]$ (e.g., German—"Lass uns spazieren gehen") are input or provided to the decoder 330. Let GloVe($w^x$) be a sequence of GloVe vectors corresponding to the words in $w^x$, and let z be a sequence of randomly initialized word vectors corresponding to the words in $w^z$.

In some embodiments, the encoder 310 includes or is implemented with a recurrent neural network (RNN). RNNs are deep learning models that process vector sequences of variable length. This makes RNNs suitable for processing sequences of word vectors 320a-e. In some embodiments, the encoder 310 can be implemented with one or more long-term short-term memory (LSTM) encoders 510a-e, which are a specific kind of RNN capable of handling long word sequences.

At a process 604, the encoder processes the sequence of word vectors 320a-e to generate one or more new vector 520a-e, each called a hidden vector. In some embodiments, the encoder 310 encodes the input sequence, for example, with each LSTM 510a-e taking in a respective word vector 320a-e and outputting the respective hidden vector 520a-e. The encoder 310 is run forward so that information generated by an LSTM encoder 510 operating on a word vector 320 appearing earlier in the input sequence is passed to LSTM encoders 510 operating on word vectors 320 appearing later in the sequence. This allows the hidden vectors of the later LSTM encoders 510 to incorporate information for the earlier word vectors 320. In some embodiments, the encoder 310 is also run backwards so that the LSTM encoders 510a-e can generate or output hidden vectors that incorporate information from words that appear later in the sequence. These backwards output vectors can be concatenated with the forwards output vectors to yield a more useful hidden vector. Each pair of forward and backward LSTMs can be treated as a unit, and is typically referred to as a bidirectional LSTM. A bidirectional LSTM encoder incorporates information that precedes and follows the respective word. The LSTM trained on machine translation may be referred to as MT-LSTM. The first bidirectional LSTM 510a processes its entire sequence before passing outputs to the second LSTM 510b; the second bidirectional LSTM 510b does the same, and so on. Each of the bidirectional LSTMs (or biLSTM) generates an output at each time step i as $h_i$ as the concatenation of $\vec{h}_i$ and $\overleftarrow{h}_i$ according to: $\vec{h}_i=\text{LSTM}(x_i, \vec{h}_{i-1})$; $\overleftarrow{h}_i=\text{LSTM}(x_i, \overleftarrow{h}_{i+1})$, where x is the input to the respective biLSTM and LSTM corresponds to a long-term short-term memory network. The encoder 310 with bidirectional LSTMs 510a-e takes in a sequence of word vectors 320a-e, runs a forward and a backward LSTM operation, concatenates the outputs corresponding to the same input, and returns the resulting sequence of hidden vectors h 520a-e for the first language (e.g., English) sentence.

$$h=\text{MT-LSTM}(\text{GloVe}(w^x)). \quad (1)$$

For machine translation, the MT-LSTM supplies the context for an attentional decoder that produces a distribution over output words $p(\hat{w}^z_t|H, w^z_1, \ldots, w^z_{t-1})$ at each time-step t, where H refers to the elements of h stacked along the time dimension.

At a process 606, the decoder 330 is initialized with the final states/hidden vectors h 520a-e from encoder 310. The decoder 330 includes or is implemented with another neural network that references those hidden vectors h 520a-e as it generates or translates into the second or target language (e.g., German) sentence. Like the encoder 310, in some embodiments, the decoder 330 can include or be implemented with one or more LSTMs 530a-b, which can be bidirectional. At time-step t, the decoder 330 first uses the two-layer, unidirectional LSTM to produce a hidden state vector 550 ($h_t^{dec}$) based on the previous target embedding ($z_{t-1}$) and a context-adjusted hidden state ($\tilde{h}_{t-1}$):

$$h_t^{dec}=\text{LSTM}([z_{t-1},\tilde{h}_{t-1}],h_{t-1}^{dec}). \quad (2)$$

The first of the decoder LSTMs 530a is initialized from the final states h of the encoder 310 and reads in a special German word vector 540a to start.

At a process 610, a word from the sequence in the first language is selected. In some embodiments, an attention mechanism 560 looks back at the hidden vectors 520a-e in order to decide which word of the first language (e.g., English) sentence to translate next. The attention mechanism 560 computes a vector of attention weights α representing the relevance of each encoding time-step to the current decoder state.

$$\alpha_t=\text{softmax}(H(W_1 h_t^{dec}+b_1)) \quad (3)$$

At a process 612, the attention mechanism 560 generates a new vector 570, which can be referred to as the context-adjusted state. The attention mechanism 560 uses the weights α as coefficients in an attentional sum that is concatenated with the decoder state and passed through a tanh layer to form the context-adjusted hidden state $\tilde{h}$:

$$\tilde{h}_t=[\tanh(W_2 H^T \alpha_t+b_2);h_t^{dec}] \quad (4)$$

In other words, the attention mechanism 560 uses the decoder state vector 550a to determine how important each hidden vector 520a-e is, and then produces the context-adjusted state 570 to record its observation.

At a process 614, a generator 580 looks at the context-adjusted state 570 to determine the word in the second language (e.g., German) to output. The context-adjusted state 570 is passed back to the next LSTM 540 so that it has an accurate sense of what it has already translated. The distribution over output words is generated by a final transformation of the context-adjusted hidden state:

$$p(\hat{w}^z_t|X,w^z_1,\ldots,w^z_{t-1})=\text{softmax}(W_{out}\tilde{h}_t+b_{out})$$

At a process 616, a determination is made as to whether the current word in the first language is the final word in the sequence. If not, decoder 330 repeats processes 610-616 until it has completed generating the translated word sequence in the second language.

In some examples, training of an MT-LSTM of the encoder 310 uses fixed 300-dimensional word vectors, such as the CommonCrawl-840B GloVe model for English word vectors. These word vectors are completely fixed during training, so that the MT-LSTM learns how to use the pretrained vectors for translation. The hidden size of the LSTMs in all MT-LSTMs is 300. Because all MT-LSTMs are bidirectional, they output 600-dimensional vectors. The encoder 310 can be trained with stochastic gradient descent with a learning rate that begins at 1 and decays by half each epoch after the validation perplexity increases for the first time. Dropout with ratio 0:2 may be applied to the inputs and outputs of all layers of the encoder 310 and decoder 330.

When training is finished, the pre-trained encoders can be used to improve the performance of neural models trained for other tasks in natural language processing (NLP). The LSTMs 510 that were trained as an encoder for machine translation can be extracted, and their learning transferred to downstream NLP tasks (e.g., classification, or question answering). The pre-trained LSTMs, which may be referred to as an MT-LSTM, can be used to output hidden vectors for other sentences or word sequences in the first language. These machine translation hidden vectors, when used as inputs to another NLP model, provide or serve as context-specific word vectors or "context vectors" (CoVe). If w is a sequence of words and GloVe(w) is the corresponding sequence of word vectors produced by the GloVe model, then $$CoVe(w)=MT\text{-}LSTM(GloVe(w)) \quad (5)$$

is the sequence of context vectors produced by the MT-LSTM. Referring back to FIG. 5, for example, GloVe(w) corresponds to 320a-e, and CoVe(w) corresponds to 520a-e. In some embodiments, for the downstream NLP task, for an input sequence w, each vector in GloVe(w) can be concatenated with its corresponding vector in CoVe(w) to yield a vector sequence (w):

$$\tilde{w}=[GloVe(w);CoVe(w)] \quad (6)$$

Some examples of computing devices, such as computing device 100 may include non-transitory, tangible, machine readable media that include executable code that when run by one or more processors (e.g., processor 110) may cause the one or more processors to perform the processes of method 600. Some common forms of machine readable media that may include the processes of method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 7:
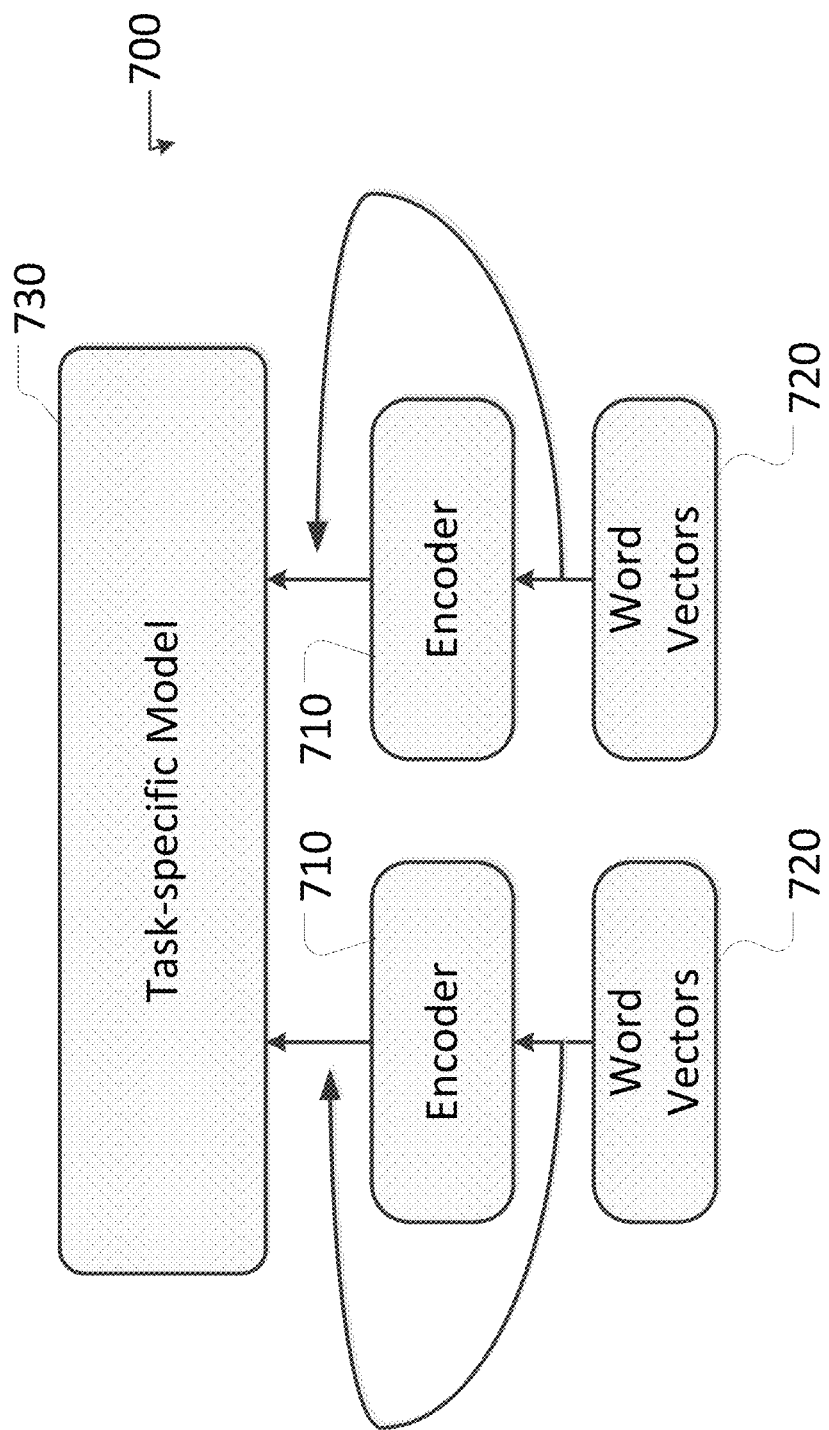
FIG. 7 is a simplified diagram of a system for natural language processing according to some embodiments.

FIG. 7 is a simplified diagram illustrating a system 700 for natural language processing according to some embodiments. System 700 includes one or more encoders 710, pre-trained on a first NLP task, such as, for example machine translation, as described herein, and now re-used as part of a new model. In some embodiments, each encoder 710 is consistent with encoder 310. In some embodiments, each encoder 710 includes or is implemented with one or more pre-trained MT-LSTMs. Pre-trained encoder 710 is capable of providing or generating context vectors (CoVe) from input word vectors 720.

Word vectors 720 of a model can be initialized with those obtained by running methods like word2vec, FastText, or GloVe, each of which defines a way of learning word vectors with useful properties. In some embodiments, the word vectors 720 of a model are initialized to lists of random numbers before the model is trained for a specific task.

System 700 also includes neural model 730 for performing a second, specific NLP task, such as, for example, sentiment analysis (Stanford Sentiment Treebank (SST), IMDb), question classification (TREC), entailment classification (Stanford Natural Language Inference Corpus (SNLI)), question answering (Stanford Question Answering Dataset (SQuAD)) and/or the like. In some embodiments, neural model 730 is consistent with neural network of model 130. Neural model 730 is provided with the context vectors (CoVe) from pre-trained encoders 710. In some embodiments, the context vectors (CoVe) from encoder 710 may be appended or concatenated with the word vectors 720 (e.g., GloVe) that are typically used as inputs to these kinds of neural models (see Eq. 6), and the results provided to the neural model 730. This approach improves the performance of the neural model 730 for downstream tasks over that of baseline models using pre-trained word vectors alone. In general, context vectors (CoVe) can be used with any neural model 730 that represents its inputs as a sequence of vectors. Experiments have shown the advantages of using pre-trained MT-LSTMs to generate context vectors (CoVe) for neural models performing NLP tasks such as text classification and question answering models. For the Stanford Sentiment Treebank (SST) and the Stanford Natural Language Inference Corpus (SNLI), the use of context vectors (CoVe) pushes performance of the baseline model to the state of the art.

Figure 8:
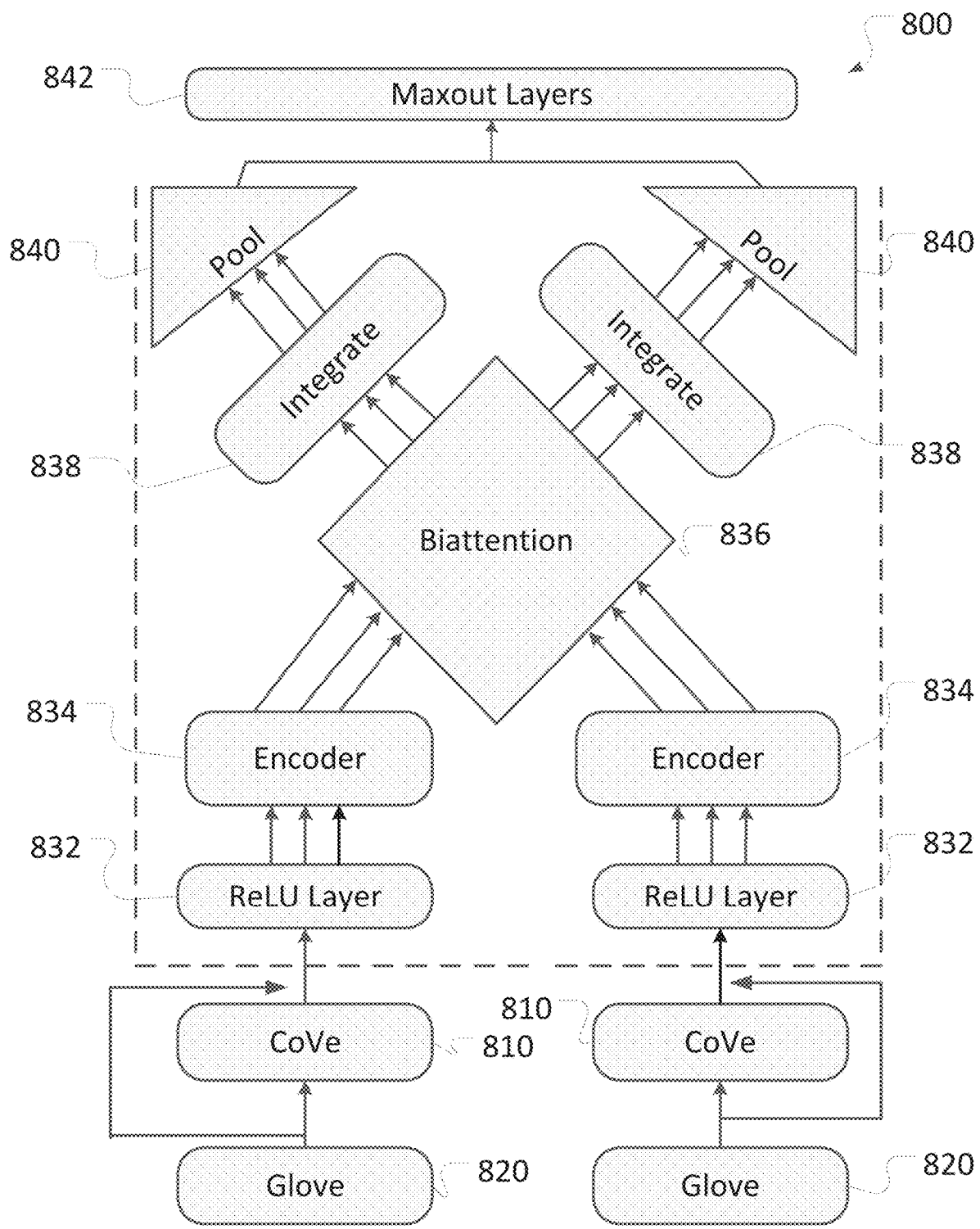
FIG. 8 is a simplified diagram of a system for natural language processing using an encoder pre-trained on an NLP task of translation according to some embodiments.

FIG. 8 is a diagram illustrating a system 800 for natural language processing using one or more encoders 810 pre-trained on an NLP task of translation according to some embodiments. In some embodiments, each encoder 810 is consistent with encoder 310, 710. System 800 may include or be implemented with a multi-layer neural network or neural model 830 for performing a specific NLP task—such as, for example, question classification (TREC), question answering (SQuAD), sentiment analysis (SST, IMDb), entailment classification (SNLI), and/or the like—which is different from the NLP task of translation. In some embodiments, neural model 830 is consistent with neural model 130, 730.

The neural model 830 of system 800 may be trained for the specific NLP tasks with suitable datasets. For example, training of the neural model 830 for question classification may use the small TREC dataset of open-domain, fact-based questions divided into broad semantic categories, as described in further detail in Voorhees, et al., "The TREC-8 question answering track evaluation," *The Eighth Text Retrieval Conference*, volume 1999, p. 83, which is incorporated by reference herein. This dataset can be the fifty-class or six-class versions of TREC, referred to as TREC-50 and TREC-6, respectively. Both have 4,300 training examples, but TREC-50 has finer-grained labels. For question answering, the neural model 830 can be trained with the Stanford Question Answering Dataset (SQuAD), as described in further detail in Rajpurkar, et al., "SQuAD: 100,000+ questions for machine comprehension of text," *arXiv preprint arXiv:* 1606.05250, submitted on Jun. 16, 2016, which is incorporated by reference herein. SQuAD is a large-scale question answering dataset with 87,599 training examples and 10,570 development examples. Examples consist of a paragraph from English Wikipedia and associated question-answer pairs over the paragraph. SQuAD examples assume that the question is answerable and the answer is contained verbatim somewhere in the paragraph. For sentiment analysis, the neural model 830 can be separately trained on two sentiment analysis datasets: the Stanford Sentiment Treebank (SST) (as described in further detail in Socher, et al., "Recursive deep models for semantic compositionality over a sentiment Treebank," *Empirical Methods in Natural Language Processing*, 2013, which is incorporated by reference herein) and the IMDb dataset (as described in further detail in Maas, et al., "Learning word vectors for sentiment analysis," *In Proceedings of the 49th Annual Meetings of the Association for Computational Linguistics: Human Language Technologies*, pp. 142-150, Portland, Oreg., USA, June 2011. Association for Computational Linguistics. URL http://www.aclweb.org/anthology.P11-1015], which is incorporated by reference herein). Both of these datasets comprise movie reviews and their sentiment. The binary version of each dataset is used, as well as the five-class version of SST. IMDb contains 22,500 multi-sentence reviews, each of which can be truncated to the first 200 words. SST-2 contains 56,400 examples with the "neutral" class removed and all sub-trees included, and SST-5 contains 94,200 reviews with all classes and sub-trees. For entailment, the neural model 830 can be trained with the Stanford Natural Language Inference Corpus (SNLI), as described in further detail in Bowman, et al., "Recursive neural networks for learning logical semantics," *arXiv preprint arXiv:* 1406.1827, submitted on Jun. 6, 2014, which is incorporated by reference herein. SNLI has 550,152 training, 10,000 validation, and 10,000 testing examples. Each example consists of a premise, a hypothesis, and a label specifying whether the premise entails, contradicts, or is neutral with respect to the hypothesis.

As shown in FIG. 8, system 800 includes a neural model 830 for a general biattentive classification network (BCN). This model 830 is designed to handle both single-sequence and two-sequence classification tasks. In the case of single-sequence tasks, the input word sequence is duplicated to form two sequences.

The two input sequences $w^x$ and $w^y$ are provided as word vectors 820 (e.g., Glove(w)) to system 800 at pre-trained encoders 810. In some embodiments, each encoder 810 is consistent with encoder 310, 710. The encoders 810 are pre-trained on the NLP task of machine translation, and thus provide or generate respective context vectors (CoVe)(w)) from input word vectors 820. In some embodiments, each word vector 820 (e.g., Glove(w)) is concatenated or appended with its corresponding context vectors (CoVe)(w)) to generate sequences of vectors, $\tilde{w}^x$ and $\tilde{w}^y$, as described herein (e.g., Eq. 6). The vector sequences, $\tilde{w}^x$ and $\tilde{w}^y$ are provided as input to the task-specific portion of the model 830.

The neural network or model 830 is trained using the pre-trained encoders 810. In some embodiments, the encoders 810 are not further trained when neural network or model 830 is trained.

The model 830 includes one or more rectifier linear units (ReLUs) 832, which receive the input vector sequences $\tilde{w}^x$ and $\tilde{w}^y$. The ReLUs 832 implement or execute a function $f$ that applies a feedforward network with ReLU activation (as described in further detail in Nair et al., "Rectified linear units improve restricted Boltzmann machines," *Proceedings of the 27th International Conference on Machine Learning*, 2010, which is incorporated by reference herein) to each element of $\tilde{w}^x$ and $\tilde{w}^y$. Encoders 834, each of which can include or be implemented as a bidirectional LSTM (biLSTM), process the resulting sequences to obtain task specific representations (x and y):

$$x = \text{biLSTM}(f(\tilde{w}^x)) \tag{7}$$

$$y = \text{biLSTM}(f(\tilde{w}^y)) \tag{8}$$

These sequences are each stacked along the time axis to generate matrices X and Y.

In order to compute representations that are interdependent, model 830 uses a biattention mechanism 836, as described in further detail in f. Biattention conditions each representation on the other.

Using biattention mechanism 836 in neural model 830 provides an advantage, for example, in some NLP classification tasks such as entailment classification and sentiment analysis or classification. Entailment classification involves the processing of two word sequences for which there may be some form of relation—e.g., determining if one sequence being true entails the other sequence, determining if one sequence being true entails the other sequence's negation, or determining if one sequence being true allows the other to be either true or false. An example of sequences for entailment classification could be: ($w^x$) "two women are discussing circuit," and ($w^y$) "two people are discussing technology." With this example, sequence $w^x$ entails sequence $w^y$. Sentiment classification aims to determine the attitude or sentiment of a speaker or author of a word sequence with respect to some topic. Each of these sequences could be provided to a respective channel (e.g., as input for ReLU 832) in the neural model 830. An example of a sequence for entailment classification could be: ($w^x$) "this movie was a waste of time." This sequence could be repeated and provided to each of the channels in the neural model 830. In some embodiments, the biattention mechanism 836 results in or yields a better outcome for the NLP classification task by combining attention with element-wise features of classification.

The biattention mechanism 836 first computes an affinity matrix $A=XY^T$. Biattention mechanism 836 then extracts attention weights ($A_x$ and $A_y$) with column-wise normalization:

$$A_x = \text{softmax}(A) \quad A_y = \text{softmax}(A^T) \tag{9}$$

which can be a form of self-attention when the task specific representations are the same (x=y). Next, the biattention mechanism 836 uses context summaries ($C_x$ and $C_y$)

$$C_x = A_x^T X \quad C_y = A_y^T Y \tag{10}$$

to condition each sequence on the other.

Two separate integrators 838 integrate the conditioning information (generated from biattention mechanism 836) into the task specific representations (x and y) for each input sequence. In some embodiments, each integrator 838 which can include or be implemented with a one-layer biLSTM. The biLSTMs operate on the concatenation of the original representations (to ensure no information is lost in conditioning), their differences from the context summaries ($C_x$ and $C_y$, to explicitly capture the difference from the original signals), and the element-wise products between originals and context summaries (to amplify or dampen the original signals).

$$X_{|y} = \text{biLSTM}([X; X-C_y; X \odot C_y]) \tag{11}$$

$$Y_{|x} = \text{biLSTM}([Y; Y-C_x; Y \odot C_x]) \tag{12}$$

Pool mechanisms 840 aggregate the outputs of the bidirectional LSTMs of integrators 838 by pooling along the time dimension. In some embodiments, max and mean pooling can be used to extract features. In some embodiments, adding both min pooling and a parameter-less form of self-attentive pooling has been found to aid in some tasks. Each type of pooling captures a different perspective on the conditioned sequences. The self-attentive pooling computes weights ($\beta_x$ and $\beta_y$) for each time step of the sequence:

$$\beta_x = \text{softmax}(X_{|y}v_1 + d_1) \quad \beta_y = \text{softmax}(Y_{|x}v_2 + d_2) \quad (13)$$

The weights ($\beta_x$ and $\beta_y$) are used to get weighted summations ($x_{self}$ and $y_{self}$) of each sequence:

$$x_{self} = X_{|y}^T \beta_x, \quad y_{self} = Y_{|x}^T \beta_y \quad (14)$$

The pooled representations are combined to get one joined representation ($x_{pool}$ and $y_{pool}$) for all inputs:

$$x_{pool} = [\max(X_{|y}); \text{mean}(X_{|y}); \min(X_{|y}); x_{self}] \quad (15)$$

$$y_{pool} = [\max(Y_{|x}); \text{mean}(Y_{|x}); \min(Y_{|x}); y_{self}] \quad (16)$$

For a NLP task of classification, the joined representation are provided or input into maxout layers 842. The maxout layers 842 can be implemented as a three-layer, batch-normalized (as described in further detail in Ioffee, et al., "Batch normalization: Accelerating deep network training by reducing internal covariate shift," *Proceedings of the 32nd International Conference on Machine Learning*, 2015, incorporated by reference herein) maxout network (as described in further detail in Goodfellow, et al., "Maxout networks," *Proceedings of the 30th Annual Conference on Machine Learning*, 2013, which is incorporated by reference herein) to produce a probability distribution over possible classes.

As discussed above and further emphasized here, FIG. 8 is merely an example of a system for natural language processing which should not unduly limit the scope of the claims. One of ordinary skill in the art would recognize many variations, alternatives, and modifications. In some embodiments, system 800 may be modified so that it performs a different NLP task, such as, for example, question answering. For a NLP task of question answering, the task specific sequences x and y are obtained in the same way as for classification (Eq. 7 and Eq. 8), except that the function f is replaced with a function g that uses a tanh activation instead of a ReLU activation. In this case, one of the sequences is the document and the other is the question in the question-document pair. These sequences x and y are then fed through the coattention and dynamic decoder implemented, for example, as the Dynamic Coattention Network (DCN), as described in further in Xiong, et al., "Dynamic memory networks for visual and textual question answering," In *Proceedings of the 33rd International Conference on Machine Learning*, pages 2397-2406, 2016, which is incorporated by reference herein.

Figure 9:
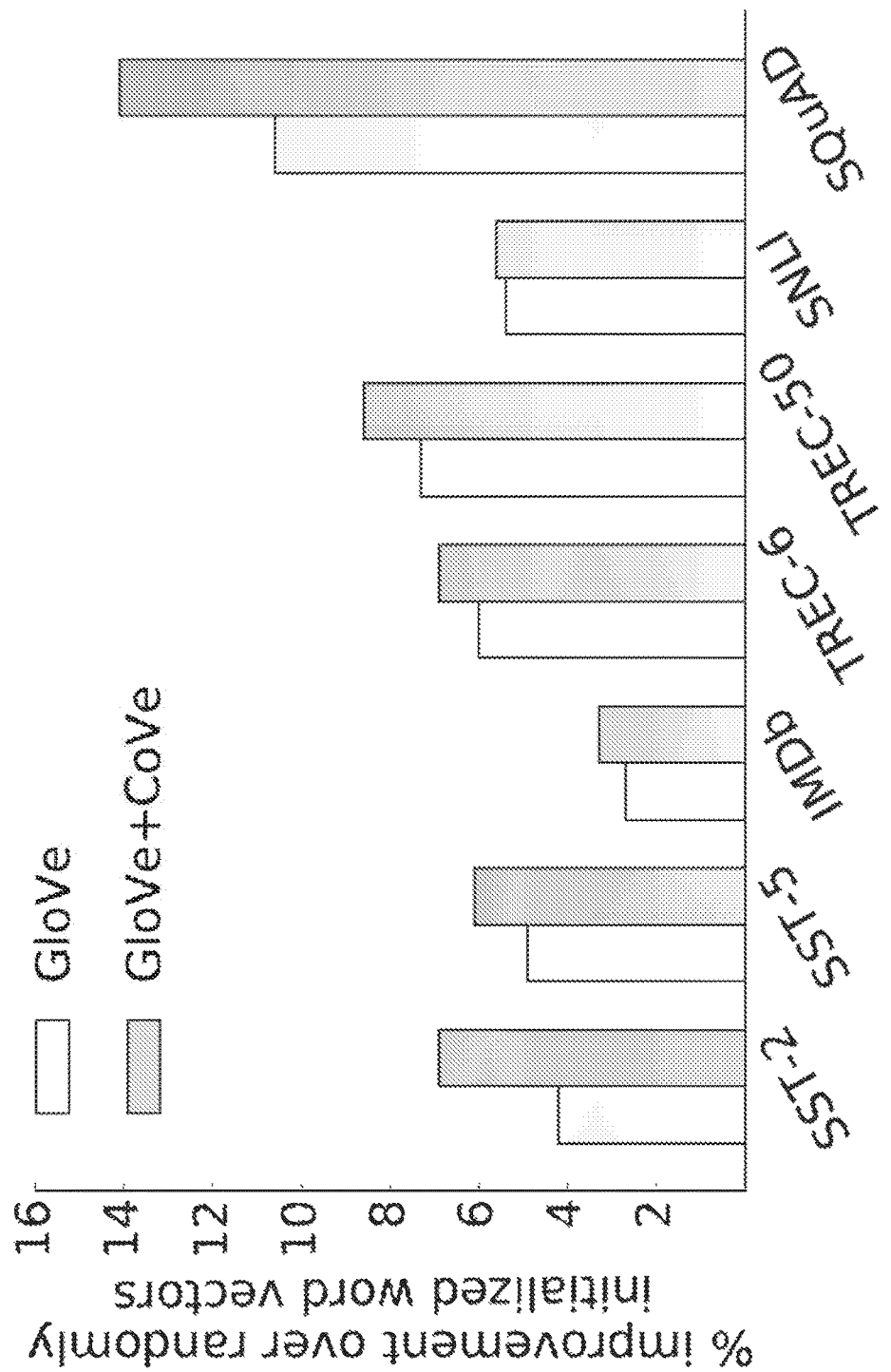
FIGS. 9 and 10 are simplified diagrams comparing performance of systems for natural language processing based on different input encodings.
Figure 10:
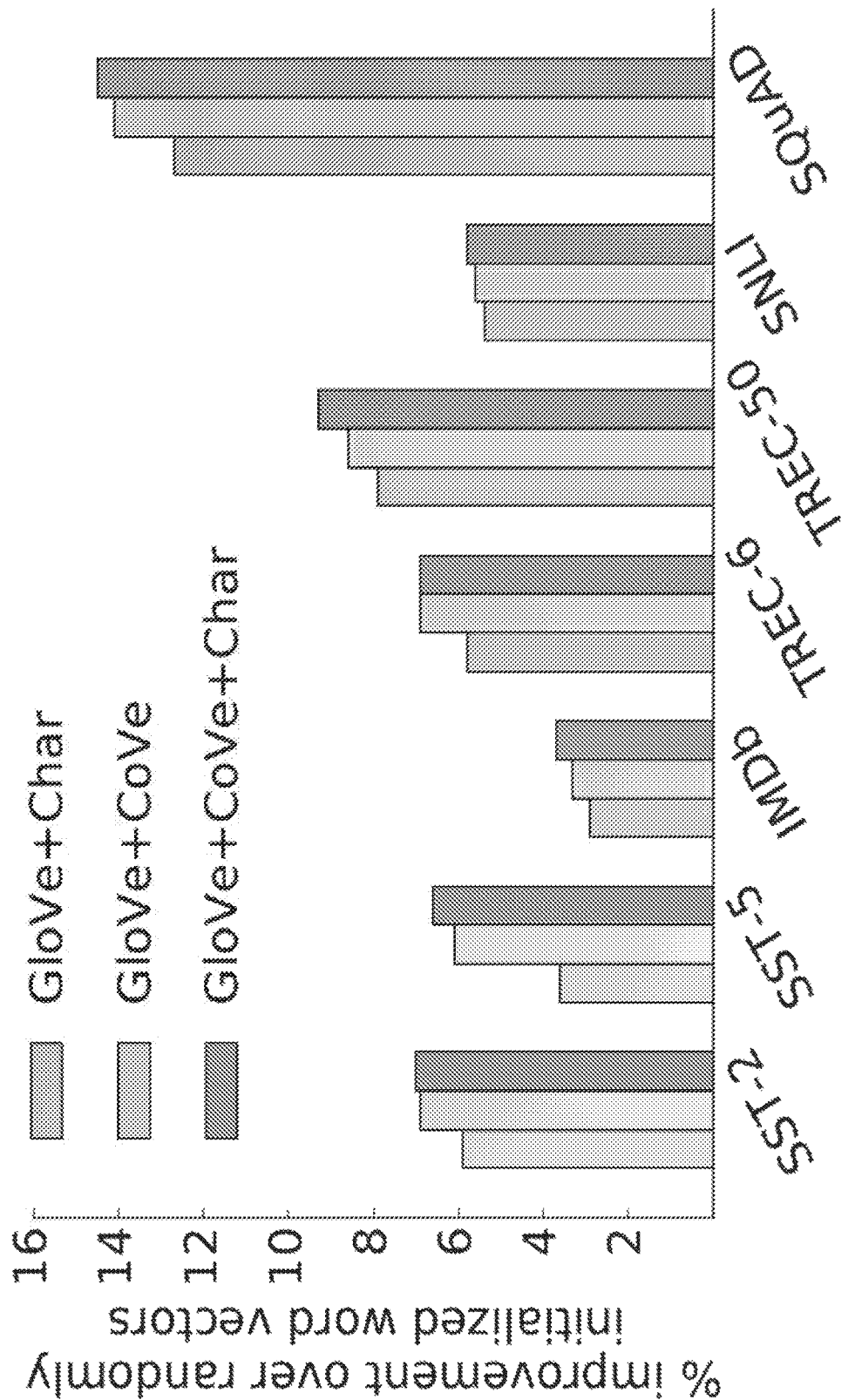

FIGS. 9 and 10 are simplified diagrams comparing the performance of systems for natural language processing based on different input encodings. These FIGS. 9 and 10 illustrate how varying the input representations—e.g., GloVe alone, GloVe plus CoVe, GloVe plus Char, and GloVe plus CoVe plus Char—affects the final performance of NLP tasks such as sentiment analysis, question classification, entailment classification, and question answering.

Likewise, FIG. 11 is a table illustrating performance results of systems for natural language processing based on different input representations (SST-2, SST-5, IMDb, TREC-6, TREC-50, SNLI, SQuAD), and with different training sets (MT-Small, MT-Medium, and MT-Large) for the encoder (CoVe-S, CoVe-M, CoVe-L, respectively).

FIGS. 9 and 10 shows that models that used CoVe alongside GloVe achieved higher performance than models that used only GloVe. FIG. 11 shows that using CoVe in Eq. 6 brings larger improvements than using character n-gram embeddings, as described in further detail in Hashimoto, et al., "A joint many-task model: Growing a neural network for multiple NLP tasks," *arXiv preprint arXiv* 1611.01587, submitted on Nov. 5, 2016, which is incorporated by reference herein. It also shows that altering Eq. 6 by additionally appending character n-gram embeddings can boost performance even further for some NLP tasks. This suggests that the information provided by CoVe is complementary to both the word-level information provided by GloVe as well as the character-level information provided by character n-gram embeddings.

FIGS. 9-11 validate the advantage or benefit of transferring knowledge from an encoder pretrained on machine translation to a variety of other downstream NLP tasks. In all cases, models that use context vectors (CoVe) performed better than baselines that used random word vector initialization, baselines that used pretrained word vectors from a GloVe model, and baselines that used word vectors from a GloVe model together with character n-gram embeddings.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A system comprising:
   a neural network for performing a first natural language processing task, the neural network comprising:
      a plurality of activation function units adapted to respectively apply a feedforward network with a rectified linear function on a plurality of input vector sequences to produce respective activation sequences;
      a plurality of encoders adapted to receive the activation sequences and respectively generate a first task specific representation relating to a first input vector sequence of the plurality of input vector sequences and a second task specific representation relating to a second input vector sequence of the plurality of input vector sequences; and
      a biattention mechanism adapted to generate conditioning information that indicates interdependent representations relating to the first task specific representation and the second task specific representation.

2. The system of claim 1, wherein the first input vector sequence comprises a first concatenated word vector and its corresponding context-specific word vector generated from a first word sequence and the second input vector sequence comprises a second concatenated word vector and its corresponding context-specific word vector generated from a second word sequence.

3. The system of claim 1, wherein the first natural language processing task performed by the neural network is one of sentiment classification and entailment classification.

4. The system of claim 1, wherein the neural network is trained using a dataset for one of sentiment analysis, question classification, entailment classification, and question answering.

5. The system of claim 2, further comprising an encoder that is pre-trained on a second natural language processing task, the encoder capable of generating a context-specific word vector for one of the first and second word sequences, the context-specific word vector forming at least a part of one of the first and second input vector sequences.

6. The system of claim 5, wherein the second natural language processing task is machine-translation.

7. The system of claim 5, wherein the first natural language processing task is different from the second natural language processing task.

8. The system of claim 1, wherein adapting by the biattention mechanism comprises:
computing an affinity matrix based on the first and second task specific representations;
extracting, based on the affinity matrix, a first attention weight relating to the first task specific representation and a second attention weight relating to the second task specific representation; and
generating, based on the first and second attention weights, a first context summary and a second context summary to condition the first and second task specific representations.

9. The system of claim 8, wherein the neural network further comprises:
a first integrator capable of integrating the first context summary to generate a first integrated output; and
a second integrator capable of integrating the second context summary to generate a second integrated output.

10. The system of claim 9, wherein the neural network further comprises:
a first pool mechanism capable of aggregating the first integrated output to generate a first pooled representation relating to the first task specific representation; and
a second pool mechanism capable of aggregating the second integrated output to generate a second pooled representation relating to the second task specific representation.

11. The system of claim 10, wherein the neural network further comprises a maxout layer capable of combining the first and second pooled representations to generate a result for the first natural language processing task.

12. A method for performing a first natural language processing task, the method comprising:
executing a plurality of activation function units adapted to respectively apply a feedforward network with a rectified linear function on a plurality of input vector sequences to produce respective activation sequences;
generating, based on the execution of the plurality of activation function units on the plurality of input vector sequences, a first task specific representation relating to a first input vector sequence of the plurality of input vector sequences and a second task specific representation relating to a second input vector sequence of the plurality of input vector sequences; and computing, based on the first and second task specific representations, an interdependent representation related to the first task specific representation and the second task specific representation.

13. The method of claim 12, wherein the first input vector sequence comprises a first concatenated word vector and its corresponding context-specific word vector generated from a first word sequence and the second input vector sequence comprises a second concatenated word vector and its corresponding context-specific word vector generated from a second word sequence.

14. The method of claim 12, wherein the first natural language processing task is one of sentiment classification and entailment classification.

15. The method of claim 13, further comprising generating, using an encoder that is pre-trained on a second natural language processing task, a context-specific word vector for one of the first and second word sequences, the context-specific word vector forming at least a part of one of the first and second input vector sequences.

16. The method of claim 15, wherein the first natural language processing task is different from the second natural language processing task.

17. The method of claim 12, wherein computing the interdependent representation comprises:
computing an affinity matrix based on the first and second task specific representations;
extracting, based on the affinity matrix, a first attention weight relating to the first task specific representation and a second attention weight relating to the second task specific representation; and
generating, based on the first and second attention weights, a first context summary and a second context summary to condition the first and second task specific representations.

18. The method of claim 12, further comprising:
integrating a first context summary to generate a first integrated output; and
integrating a second context summary to generate a second integrated output.

19. The method of claim 18, further comprising:
aggregating the first integrated output to generate a first pooled representation relating to the first task specific representation; and
aggregating the second integrated output to generate a second pooled representation relating to the second task specific representation.

20. The method of claim 19, further comprising:
combining the first and second pooled representations to generate a result for the first natural language processing task.

* * * * *